United States Patent
Robbins

(10) Patent No.: US 6,948,763 B2
(45) Date of Patent: Sep. 27, 2005

(54) COVER ASSEMBLY FOR TRUCK BED EXTENDER

(76) Inventor: Timothy Robbins, 19662 E. Batvia Dr., Aurora, CO (US) 80011

( * ) Notice: Subject to any disclaimer, the term of this patent is extended or adjusted under 35 U.S.C. 154(b) by 0 days.

(21) Appl. No.: 10/776,093

(22) Filed: Feb. 10, 2004

(65) Prior Publication Data

US 2005/0168008 A1  Aug. 4, 2005

Related U.S. Application Data

(60) Provisional application No. 60/446,492, filed on Feb. 11, 2003.

(51) Int. Cl.[7] ............................................. B60J 11/04
(52) U.S. Cl. .......................... 296/136.07; 296/1.07; 296/136.1
(58) Field of Search ................. 296/26.08, 57.1, 296/50, 1.01, 1.07, 136.01, 136.04, 136.1, 296/136.07, 136.12

(56) References Cited

U.S. PATENT DOCUMENTS

| | | | | |
|---|---|---|---|---|
| 5,868,295 A | * | 2/1999 | Carriere | 224/404 |
| 5,911,464 A | * | 6/1999 | White | 296/26.11 |
| 6,141,891 A | * | 11/2000 | Troccola | 37/196 |
| 6,402,215 B1 | * | 6/2002 | Leitner et al. | 296/26.11 |
| 6,719,345 B2 | * | 4/2004 | Ootsuka et al. | 296/26.08 |
| 6,749,250 B1 | * | 6/2004 | Reid | 296/136.07 |
| 2003/0183668 A1 | * | 10/2003 | Hancock et al. | 224/401 |

* cited by examiner

Primary Examiner—Jason Morrow
(74) Attorney, Agent, or Firm—Timothy J. Martin; Michael R. Henson; Rebecca A. Gegick

(57) ABSTRACT

A cover for a C-shaped truck bed extender has an end panel and a pair of opposed side panels joined to first and second panels to form an enclosure for the extender. The enclosure has an opening, and a closure panel is used to open and close the opening to provide a cover encasing the extender. Pocket structures may be provided to receive ends of the extender's leg sections. The cover may include openings in the side panels to allow passage of trunnions on mounting brackets of the extender.

21 Claims, 5 Drawing Sheets

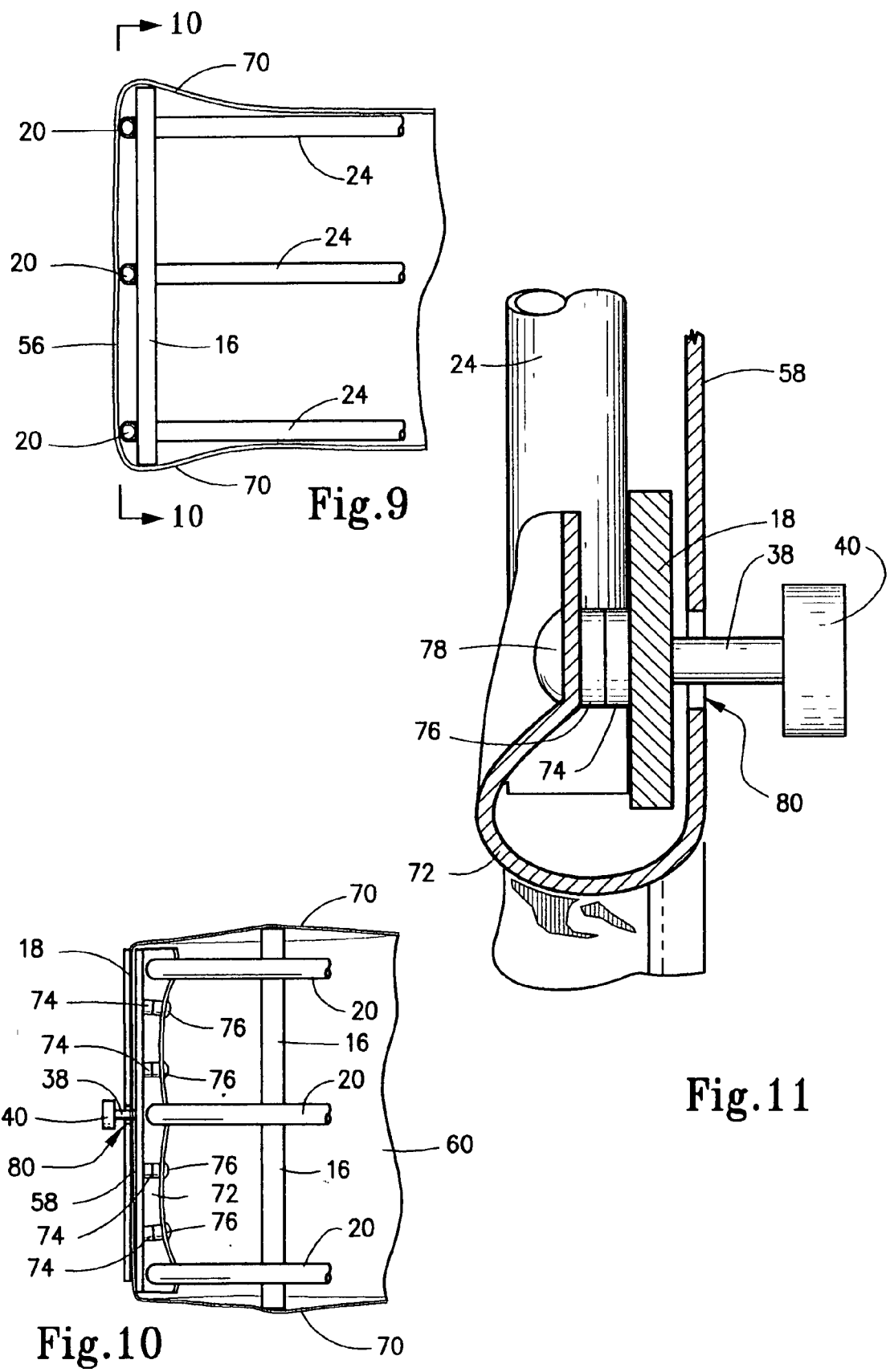

COVER ASSEMBLY FOR TRUCK BED EXTENDER

This application claims benefit of U.S. provisional 60/446,492 filed Feb. 11, 2003.

FIELD OF THE INVENTION

The present invention broadly relates to vehicle accessories. In particular, the present invention concerns accessories for the bed of a pick-up truck and the like. Specifically, the present invention is directed to a cover for a truck bed extender and the combination of a truck bed extender with such cover.

BACKGROUND OF THE INVENTION

Since the advent of motorized transportation, one of the most versatile and useful vehicles is the truck. Available truck models include general-purpose trucks and specialty vehicles. General-purpose trucks, also known as "pick-up trucks" enjoy widespread popularity both as a primary means of transportation and for their hauling capabilities.

As is well known, a pick-up truck includes a wheeled frame that supports a drive train and an engine. The engine is covered by an engine compartment or hood, and a passenger compartment or "cab" is provided for the drivers or passengers. An elongated bed extends rearwardly of the cab. This bed is provided as a storage and transportation space for objects to be hauled. Typically, the bed includes a deck or floor having a front wall and a pair of sidewalls. The rear end of the bed is then enclosed by a tailgate which pivots between a closed position and an open position. When in an open position, the tailgate forms a continuation of the floor of the bed.

With the increasing popularity of trucks as a primary vehicle, pick-up trucks have developed into what is referred to as a "long bed" truck and a "short bed" truck. The principal difference between these two trucks is simply the longitudinal lengths that the truck bed extends rearwardly of the passenger cab. Long bed trucks naturally have a bed that is greater in length than a short bed truck.

As noted above, when the tailgate is open, the tailgate forms an extension of the truck floor. While this increases the available floor space upon which objects may be supported, there is no lateral or rear wall portions for the region above the tailgate. Accordingly, should objects be placed on this tailgate region, they would be more readily subject to loss from the truck bed during a transport operation. As a result, there has been recently developed an accessory for trucks called a truck bed extender. Typically, a truck bed extender is in the form of a C-shaped frame that has its ends pivotally supported by means of opposed bracket mounts secured in opposed relation at the ends of the sidewalls of the truck bed. This frame can pivot between a retracted position where it is located within the bed of the truck such that the tailgate may be closed and an extended position wherein it provides sides and an end for the region above the tailgate. When in the extended position, objects can be placed on the extension surface provided by the tailgate and yet retained by means of the c-shaped framework.

Since the bed of a truck is normally open, objects placed therein may be exposed to the elements. For this reason, it is known to provide truck beds with a cover assembly that typically attaches to the sidewalls and to the tailgate. These assemblies, often referred to as "tonto covers" not only provide shelter to objects in the truck bed but also obscure those objects from the view of passersby. Thus, objects in the truck bed are less likely to be stolen or otherwise removed by unauthorized personnel. Where greater security is desired, it is known to provide a truck bed with a locking box that can receive and secure small items, such as tools and the like.

When a tonto cover is used in conjunction with a truck bed extender, however, the tonto cover interferes with the operation of the extender since it is necessary to remove at least a portion of the cover to allow the extender to pivot from the retracted to the extended state. Moreover, the tonto cover does not extend over the framework of the truck bed extender so that objects are now more exposed to the environment and are more subject to unauthorized removal.

Accordingly, the present invention is directed to providing a versatile cover which may mount over a truck bed extender. This invention also is directed to the combination of the truck bed extender with such cover assembly.

SUMMARY OF THE INVENTION

It is an object of the invention to provide a new and useful cover that may be used with a traditional truck bed extender.

It is another object of the present invention to provide a cover that forms an enclosure for a truck bed extender whether in the retracted or extended state.

A further object of the present invention is to provide a combination truck bed extender and cover therefor which is simple in manufacture and easy to use.

It is still a further object of the present invention to provide a cover for a truck bed extender and/or a combination truck bed extender and cover which is highly versatile in use both in the extended position and in the retracted position.

A still further object of the present invention is to provide a cover for a truck bed extender which does not interfere with the normal operation of the truck bed extender.

According to the present invention, then, a cover is adapted to mount over a frame extender of the vehicle wherein the frame extender includes a generally C-shaped framework having a pair of leg sections and a central section joining such leg sections at one end thereof. Broadly, the cover includes first and second panels each having a front edge, a rear edge and a pair of side edges. A pair of side panels each having opposite first and second side edges, a front side edge and a rear side edge are joined to the first and second panels. Here, each of the side panels is joined to the first and second panels along the respective side edges thereof. An end panel has opposite first and second edges and opposite end edges. The end edges are joined to respective rear side edges of the side panels and the first and second edges are joined, respectively, to the rear edges of the first and second panels to define first and second rear seams. The first and second panels, the side panels and the end panel thereby form an enclosure with an opening and an interior that is sized and adapted to receive the C-shaped framework of the frame extender such that the end panel is positioned in confronting relation to the central section of the frame extender and such that the side panels of each position in confronting relation to respective leg section. A closure panel is then provided that is adapted to selectively open the opening of the enclosure to define an open state and to close the opening of the enclosure to define a closed state.

The present invention is also directed to a combination frame extender and cover therefor that is adapted to be positioned in the vehicle bed having bed sidewalls. Here, the combination includes a pair of mounts adapted to be secured in opposed relation to one another to the sidewalls of the vehicle bed to define a mounted state. A rigid, C-shaped framework is adapted to pivotally secure to the mounts in a secured state. The framework includes a pair of framework leg sections having first and second ends. A framework central section then interconnects the second ends of the framework leg sections. A transverse mounting bracket is secured to each of the first ends of each framework leg section and a trunnion pin extends outwardly of each mounting bracket so that the trunnion pins extend in opposite directions from one another with the trunnion pins being positioned to engage the mounts when in the secured state. A cover is then adapted to enclose the framework, with this cover being as set forth above or including the structure described below.

To this end, the framework can include at least one leg extending transversely of the central section to have opposed leg ends. The cover can then include a pair of opposed pocket structures adapted to receive the opposite leg ends of the leg. If desired, a plurality of legs can extend transversely of the central section in which case there is a plurality of pairs of opposed pocket structures. These pocket structures are located along the first and second seams of the cover.

The cover can include a releasable fastener associated with the closure panel with this releasable fastener operative to retain the closure panel in the closed state. Here, the closure panel may have a first edge that is secured to the first panel along the front edge thereof. If desired, the closure panel can be an integral extension of this first panel. One half of the releasable fastener is then secured on a second edge of the closure panel opposite the first edge, and the second panel can include another half of the cooperative fastener along the front edge thereof. This fastener may be a zipper.

The side panels of the cover can include a flap extending forwardly of the front side edge thereof, and cooperative fasteners are operative to secure each of these flaps around a portion of the framework, such as the transverse bracket at each end of the leg sections. If desired, one half of the cooperative mating fasteners may be located along the flaps with the other half of the cooperative mating fasteners being affixed to the transverse brackets. Here, also, an opening may be formed in each of the side panels proximate to the front side edge thereof with this opening sized and adapted to mateably received the trunnions on the framework.

Each of the panels forming the cover may conveniently be formed of a flexible material. This flexible material may be selected from a group consisting of canvas, plastic and synthetic fabrics.

Finally, the framework may be formed by a plurality of C-shaped members oriented in parallel spaced apart relation to one another. These C-shaped members may be secured to one another by a leg extending transversely at the central section and by the mounting brackets.

These and other objects of the present invention will become more readily appreciated and understood from a consideration of the following detailed description of the exemplary embodiment of the present invention when taken together with the accompanying drawings, in which:

BRIEF DESCRIPTION OF THE DRAWINGS

FIG. 9 is a side view in cross-section of an end portion of the truck bed extender of FIG. 7 received in the cover of the present invention;

FIG. 10 is a cross-sectional view taken about lines 10—10 of FIG. 9; and

FIG. 11 is a cross-sectional view taken about lines 11—11 of FIG. 8.

DETAILED DESCRIPTION OF THE EXEMPLARY EMBODIMENTS

The present invention broadly concerns accessories for trucks and similar vehicles. Specifically, however, the present invention concerns a cover used in conjunction with a truck bed extender. Thus, the invention includes both the cover itself as well as the combination of a truck bed extender with the cover.

Figure 7:
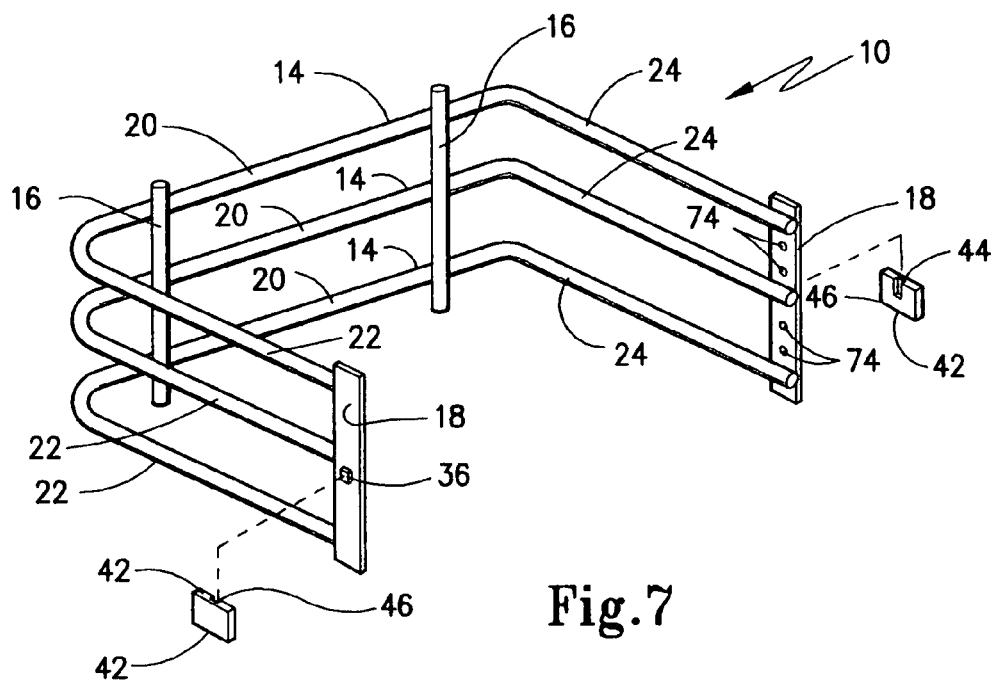
FIG. 7 is a perspective view of a truck bed extender modified according to the exemplary embodiment of the present invention.

In order to understand this invention, it is perhaps helpful to review the structure of a typical truck bed assembly according to the prior art. Such a truck bed extender is shown in a retracted position in FIG. 1 and an extended position in FIG. 2. For purposes of this discussion, a modified truck bed extender according to the present invention is depicted in FIG. 7. In these figures, truck bed extender 10 is shown to be a C-shaped framework 12 formed by three C-shaped tubular members 14 that are mounted and spaced apart, generally parallel relationship by means of a pair of upright legs 16 and end brackets 18. Tubular members 14 may be of any suitable material, such as a steel tube of circular cross-section. Legs 16 are generally constructed of the same material and are secured thereto by welding or mechanical fasteners. Each tubular member 14 includes a central section 20 and a pair of leg sections 22 and 24.

Figure 1:
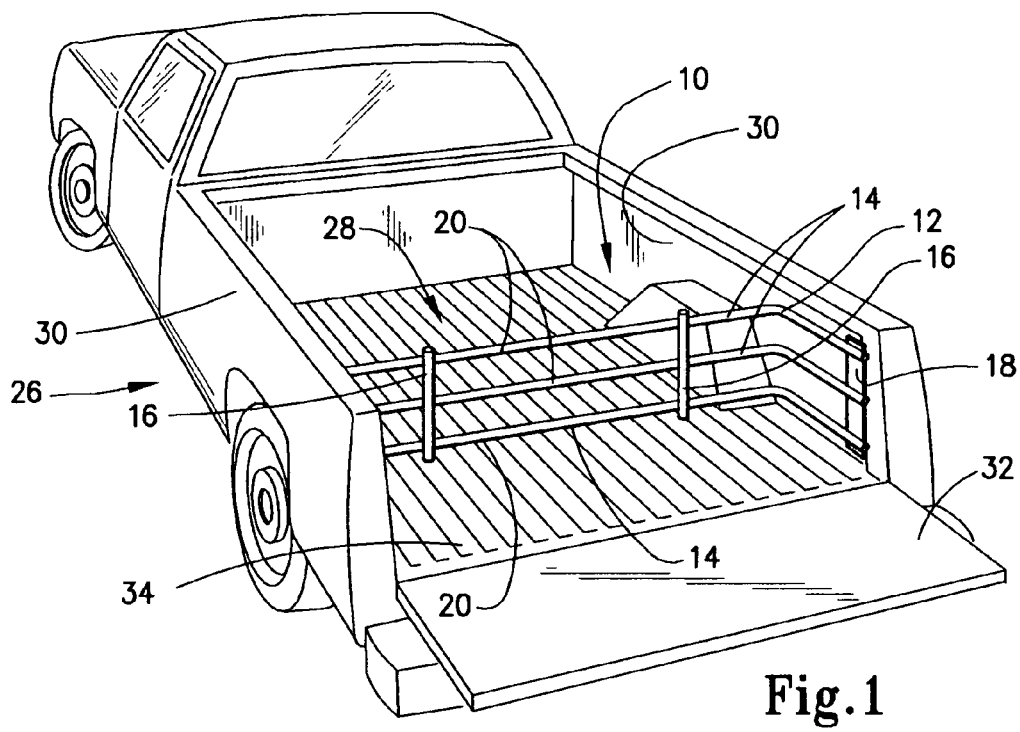
FIG. 1 is a perspective view of the rear portion of a bed of a truck showing a truck bed extender according to the prior art mounted therein in a retracted position.
Figure 2:
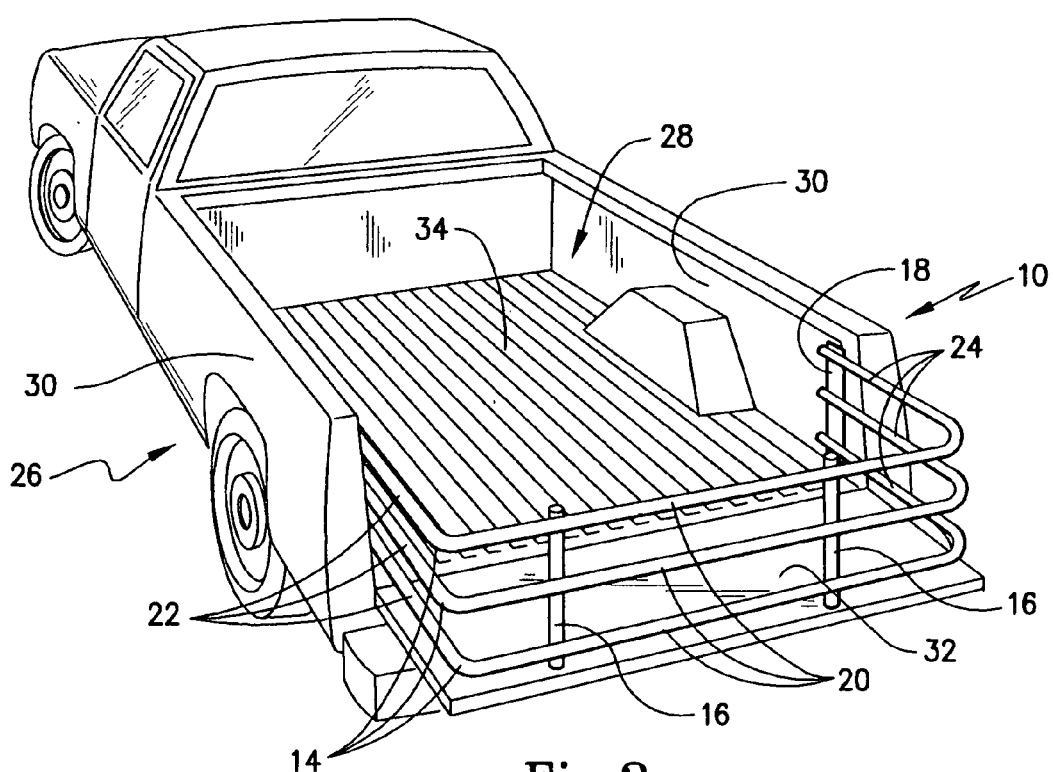
FIG. 2 is a perspective view, similar to FIG. 1, but showing the truck bed extender of the prior art in an extended position.

As is shown in FIG. 1, truck bed extender 10 may be disposed in the bed 28 of a truck 26. In FIG. 1, it may be seen that central section 20 of each tubular member 14 extends generally transversely of truck bed 28 between sidewalls 30 thereof. Truck bed extender 10 is mounted to sidewalls 30 by means of end brackets 18 so that truck bed extender 10 may be pivoted from the retracted position shown in FIG. 1 to the extended position shown in FIG. 2. As is shown in these figures, truck 28 includes a tailgate 32 that, when opened as shown in these figures, forms an extension of floor 34 of truck bed 28. In FIG. 2, it may be appreciated that, when in the extended position, legs sections 22 and 24 form a fence-like continuation of sidewalls 30 while central sections 20 of tubular members 14 form an end fence for the extended truck bed. Thus, tubular members 14 assist in maintaining items placed in truck bed 28 in a secured state therein.

The mounting of truck bed extender 10 may be more fully appreciated in reference to FIG. 7, although FIG. 7 shows some modifications to truck bed extender 10 in the form of cooperative fasteners 74 in the form of one-half a pair of mating snaps. The general structure shown in FIG. 7 is otherwise the same as that depicted in FIGS. 1 and 2. Here, it may be seen that end brackets 18 have a centrally located trunnion pin 36 affixed centrally thereof with the structure of this trunnion pin 36 being best shown in FIG. 8. Here, it may be seen that trunnion pin 36 has a shaft 38 and an enlarged head 40. A pair of mounts 42 are provided with a typical truck bed extender 10 with mounts 42 adapted to be secured to sidewall 30 of truck bed 28 adjacent to the rearward edge thereof. Brackets 42 each has an open interior 44 which communicates with a slot 46 so that a head 40 of each trunnion 36 may be received in interior 44 with shaft 38 projecting through slot 46. With this arrangement, and with reference again to FIGS. 1 and 2, it should be appreciated that truck bed extender 10 may pivot between the extended position and the retracted position on shafts 38 received in mounts 42.

Having now described the general structure of truck bed extender, it may be appreciated that extender cover 50 according to the present invention has adapted to enclose truck bed extender 10 whether it is placed in the extended position or the retracted position. Extender cover 50 is introduced in FIG. 3 where it may be seen that extender cover 50 includes spaced apart first and second panels 52 and 54, an end panel 56, a pair of side panels 58 and an end closure panel 60. Panels 52, 54, 56, 58 and 60 may be formed of a flexible fabric material, such as a water resistant canvas, but may also be constructed of any other suitable materials presently known or hereinafter developed. For example, these panels could be constructed of a plastic sheeting or synthetic material such as polyester and the like. These panels are sewn together to create a generally rectangular enclosure having an interior 62 that is sized to receive truck bed extender 10 in a fairly close fitted relationship. These panels may be sewn together along suitable seam lines, as is known in the art.

Figure 4:
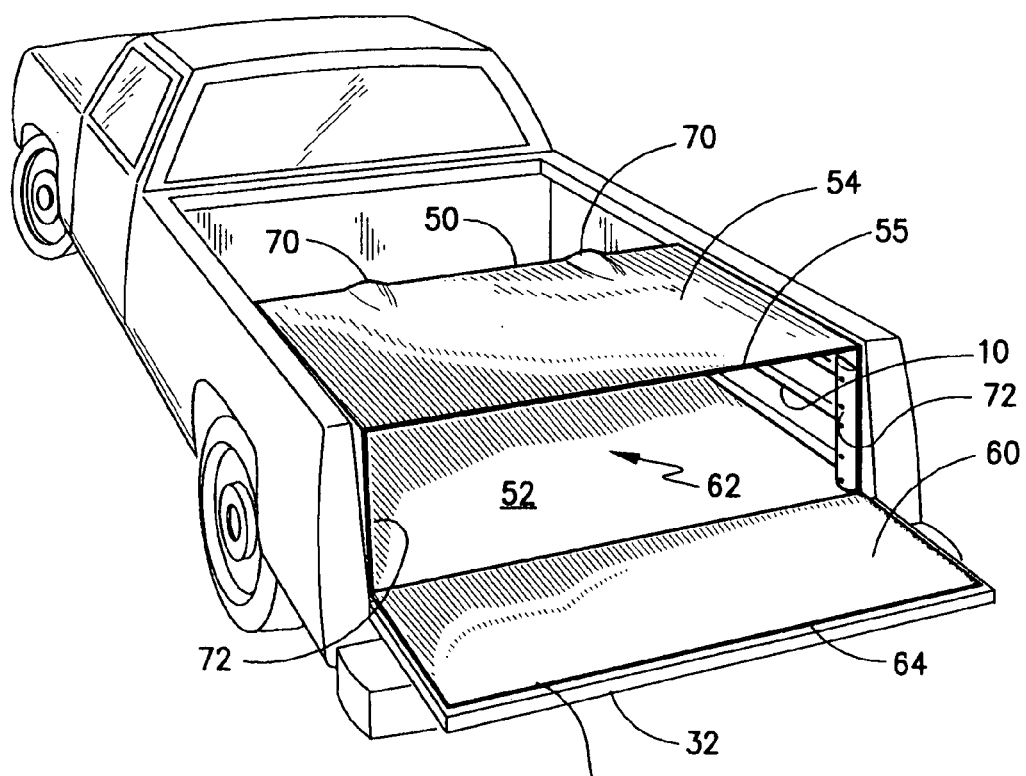
FIG. 4 is a perspective view, similar to FIG. 1, showing the truck bed cover of FIG. 3 enclosing the truck bed extender in the retracted state and with the cover in a first mounted orientation.
Figure 5:
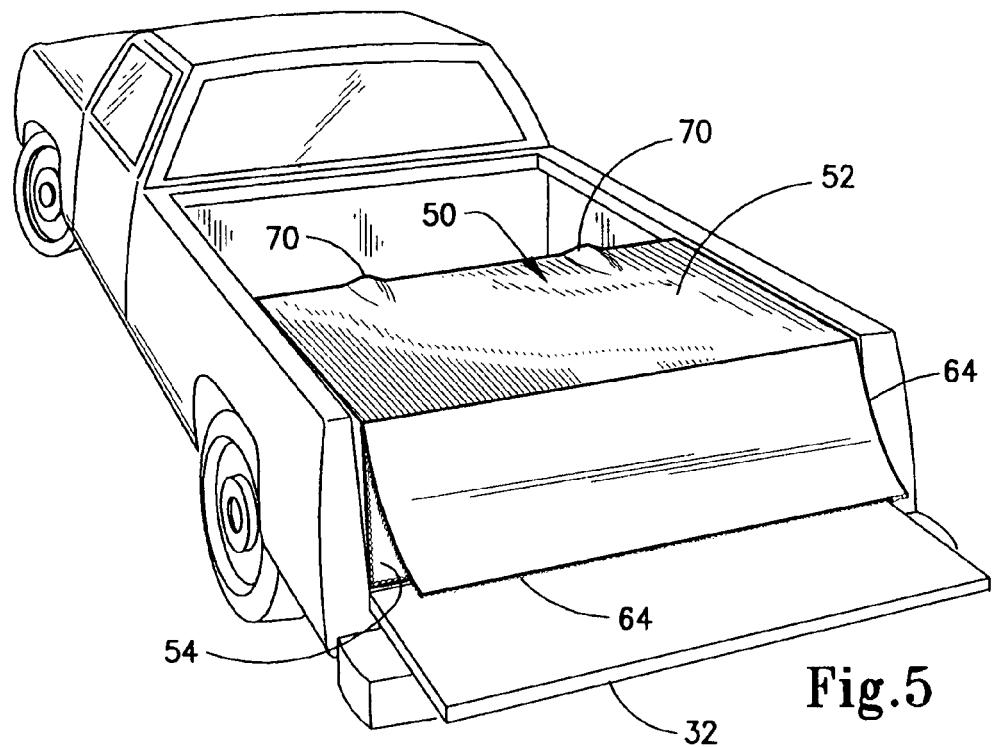
FIG. 5 is a perspective view, similar to FIG. 4, but showing the truck bed cover enclosing the truck bed extender with the truck bed extender in a retracted state and the cover in a second state of orientation.

Moreover, as is shown with respect to FIGS. 4 and 5, extender cover 50 may receive truck bed extender 10 alternatively in two states of orientation. In FIG. 4, it may be seen that, in a first orientation state, cover 50 is mounted on truck bed extender 10 such that first panel 52 forms a bottom panel for cover 50 when extender 10 is in the retracted position with second panel 54 forming an upper panel therefor. In the second orientation state, as depicted in FIG. 5, first panel 52 forms a top panel for cover 50 while second panel 54 forms a bottom panel for cover 50 when the truck bed extender 10 is in the retracted position. In either case, end closure panel 60 may be open or may be closed by means of some fastener, such as a zipper fastener 64. Zipper fastener 64 includes one half 66 that extends along edge 61 of end closure panel 60 with the other half 68 extending along the edge 55 of second panel 54.

Figure 6:
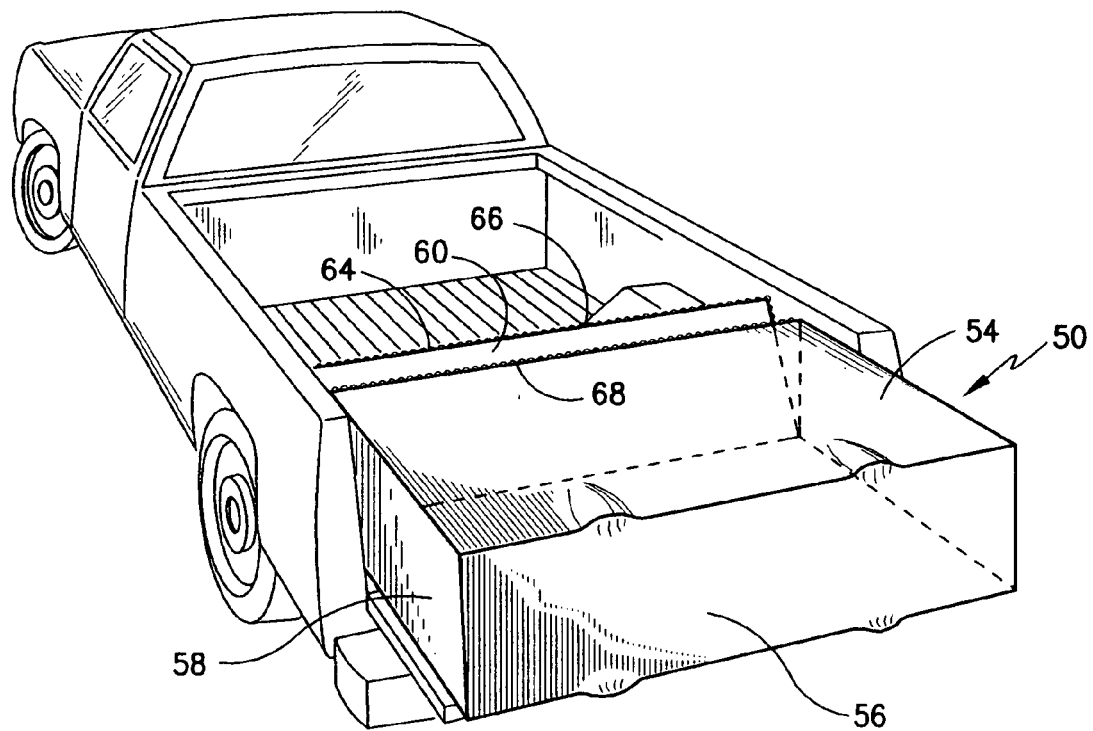
FIG. 6 is a perspective view, similar to FIG. 5, but showing the truck bed extender in the extended state with the cover in the second state of orientation.

In either orientation state, it should be appreciated that cover 50 may pivot in conjunction with truck bed extender 10 between the retracted position, such as shown in FIG. 5, to the extended position shown in FIG. 6. In either position, items that are to be transported and that are located in the region bounded by truck bed extender 10 may be protected against the elements and the viewer passersby by means of cover 50. Moreover, such items may be enclosed within cover 50 by securing end closure panel 60 by means of zipper 64.

As noted above, it is desired that extender cover 50 be dimensioned so that truck bed extender 10 be received there in a close fitted engagement. Therefore, in order to accommodate the opposite ends of each leg 16, it should be appreciated that the junction of each of first and second panels 52 and 54 with end panel 56 includes gathers that form pocket structures 70. Moreover, in order to secure cover 50 on truck bed extender 10, a pair of securing flaps 72 are located along the rearward vertical edges of each side panel 58. To this end, each flap 72 may be formed as a continuous integral extension of each sidewall 28. With reference again to FIG. 7, it may now be appreciated that truck bed extender has been modified by the inclusion of four snaps 74 that are located on each end bracket 18. Tthese snaps 74 may be mounted conveniently by machine screws or by any other attachment technique, as desired.

Figure 8:
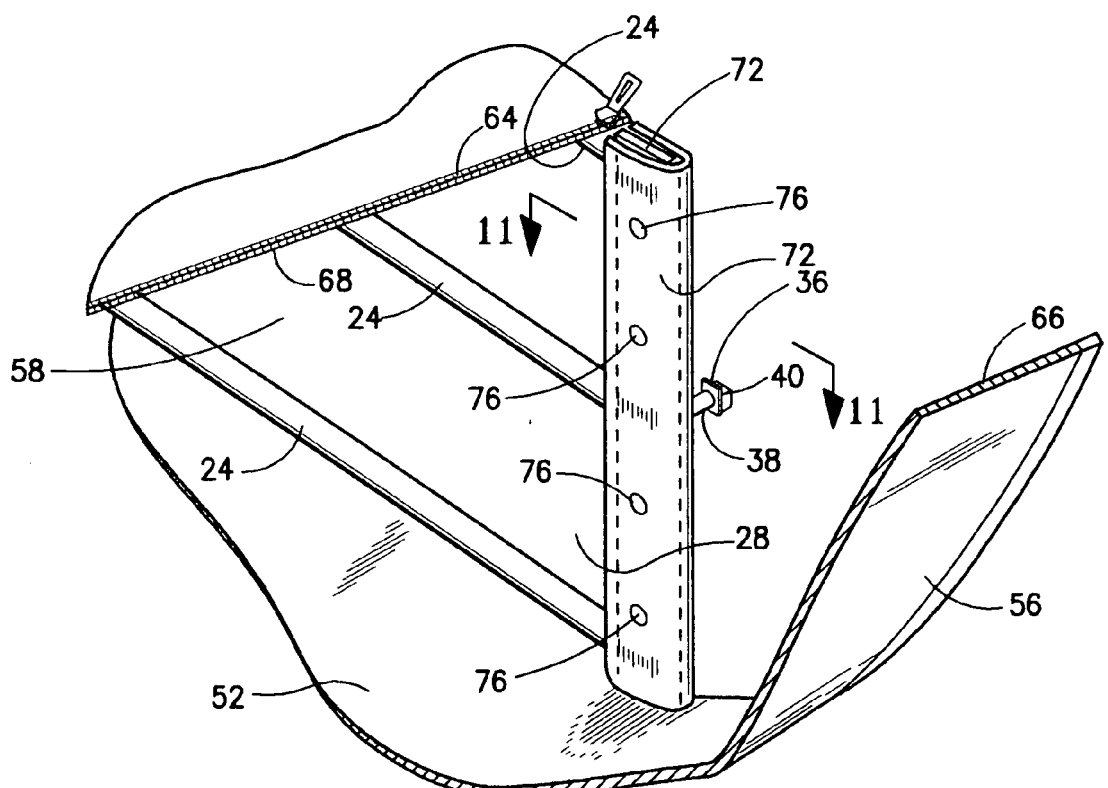
FIG. 8 is an enlarged view showing one end portion of the truck bed extender of FIG. 7 receiving the truck bed cover of FIG. 3 in the first state of orientation.

With reference to FIGS. 8 and 11, it may be seen that a representative of flap 72 may be reversed on itself to extend around an end bracket 18 and fastened to snap 74 by means of a cooperative mating snap 76 with there being a corresponding snap 76 for each snap 74. Snaps 76, as is shown in FIG. 8, are secured to flap 72 in any suitable manner, such as by a rivet 78. It should be understood, however, that the mating fasteners in the form of snaps 74,76 could be mounted entirely on the cover. Here, the snaps 74 would be secured to side panels 58.

Figure 3:
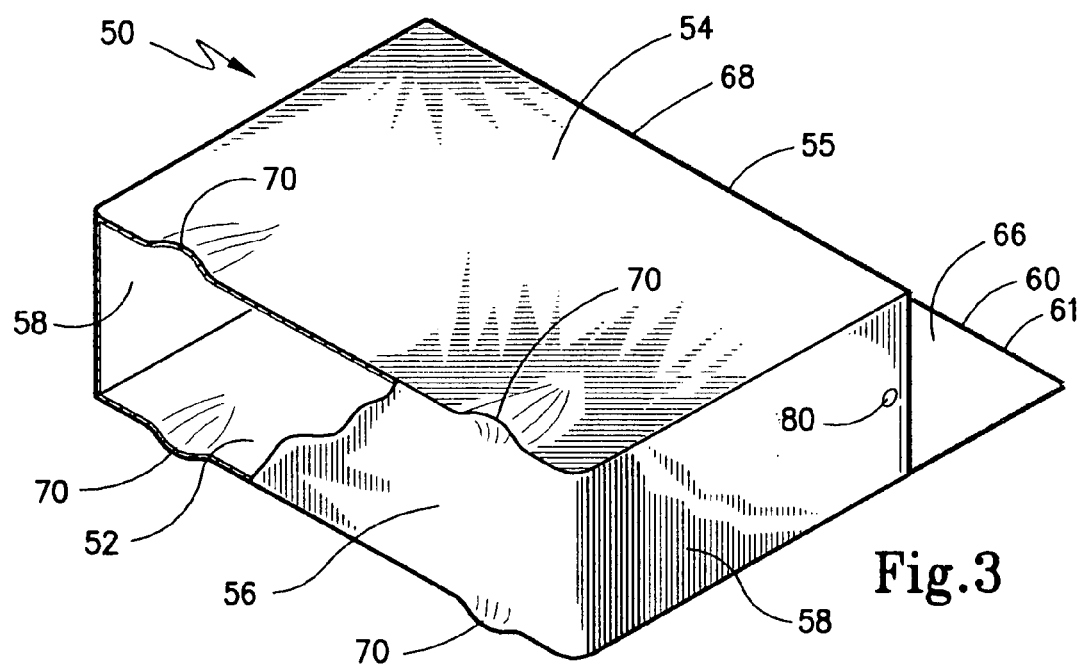
FIG. 3 is a perspective view, partially broke away, showing the truck bed extender cover according to the exemplary embodiment of the present invention.

Further, to accomplish mounting of cover 50 around mounting brackets 18, it is necessary to accommodate each of trunnion pins 36. Accordingly, each side panel 58 is provided with a small opening 80 (FIGS. 3, 10 and 11). In order to mount cover panel 50 on truck bed extender 10, then, truck bed extender 10 is lifted out of truck bed 28 by removing trunnion pins 36 from their corresponding mounts 42 leaving mounts 42 fastened to sidewalls 30 of truck bed 28. End closure panel 60 of cover 50 is opened and framework 12 is inserted into the interior 62 of cover 50 trunnion pins 36 on end brackets 18 are then inserted through openings 80 so that enlarged heads 40 and shaft 38 protrudes from the interior of cover 50. Securing flaps 72 then enclose brackets 18 and are secured to brackets 18 by means of cooperating snap portions 74 and 76. Framework 12 may be then remounted in bed 28 by engaging trunnion pins 36 with mounts 42 in the standard manner. When mounted, as shown in FIGS. 9 and 10, the opposite ends of legs 16 are disposed in pockets 70.

As noted above, cover 50 may be mounted on truck bed extender 10 so that, when extender 10 is in the retracted position, end closure panel 60 opens at the top (FIG. 4) or at the bottom (FIG. 5). In either state, access to interior 62 and the region bounded by framework 12 may be had by opening tailgate 32 and subsequently opening end closure panel 60. In the state shown in FIG. 4, end closure panel 60 may be laid onto the surface of tailgate 32 in order to protect the surface thereof. When tailgate 32 is closed, however, it is more difficult to access the interior 62 and the region bounded by framework 12; this helps protect the contents thereof from unwanted removal.

When extended, as is shown in FIG. 6, access to the region bounded by framework 12 and formed by the interior 62 may be had by opening end closure 60. This again would be either as a top closure or as a bottom closure, depending upon the initial orientation of cover 50 on truck bed extender 10.

In any case, it should now be appreciated that cover 50 protects items received therein from the elements whether truck bed extender 10 is in the retracted position or the extended position. Moreover, when in the retracted position, cover 50 restricts access to items within truck bed extender 10 and interior 62. Restricted access can be enhanced, if desired, by including a locking structure on the zipper closure to resist its being opened. Further, when in the retracted state, the provision of cover 50 along with the closing and locking of tailgate 32 further restricts access to the interior of cover 50 and the region bounded by framework 12.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A cover adapted to mount over a frame extender on a vehicle wherein said frame extender includes a generally C-shaped framework having a pair of leg sections and a central section joining said leg sections at one end thereof, said cover comprising:
   (A) first and second panels each having a front edge, a rear edge and a pair of side edges;
   (B) a pair of side panels each having opposite first and second side edges, a front side edge and a rear side edge, each of said side panels being joined to said first and second panels along the respective side edges thereof;
   (C) an end panel having opposite first and second edges and opposite end edges, said end edges being joined to the respective rear side edges of said side panels and said first and second edges being joined, respectively, to the rear edges of said first and second panels thereby to form an enclosure with an opening and an interior sized and adapted to receive said C-shaped framework therein in close-fitted engagement such that said end panel is positioned in confronting relation to said central section and such that said side panels are each positioned in confronting relation to a respective said leg section and such that said first and second panels span a region between the pair of leg sections of said C-shaped framework; and
   (D) a closure panel adapted selectively to open the opening of said enclosure to define an open state and to close the opening of said enclosure to define a closed state, said closure panel when closing the opening spanning a region between another end of each of the leg sections of said C-shaped framework opposite said one end thereof.

2. A cover according to claim 1 including a releasable fastener associated with said closure panel and operative to retain said closure panel in the closed state.

3. A cover according to claim 1 wherein said closure panel has a first edge that is secured to said first panel along the front edge thereof and including one-half of a cooperative fastener on a second edge thereof opposite said first edge, said second panel including another half of said cooperative fastener along the front edge thereof.

4. A cover according to claim 3 wherein said cooperative fastener is a zipper.

5. A cover according to claim 1 wherein the frame extender includes a mounting brackets that are pivotally secured to the vehicle by means of opposed trunnions, said cover including an opening in each of said side panels proximate to the front side edge thereof sized and adapted to matably receive said trunnions.

6. A cover according to claim 1 wherein each of said first and second panels, each of said side panels, said end panel and said closure panel is formed of a flexible material.

7. A cover according to claim 6 wherein said flexible material is selected from a group consisting of canvas, plastic, and synthetic fabrics.

8. A combination frame extender and cover therefor adapted to be positioned in a vehicle bed having bed sidewalls, comprising:
   (A) a pair of mounts adapted to be secured in opposed relation to one another to the sidewalls of said vehicle bed to define a mounted state;
   (B) a rigid C-shaped framework adapted to pivotally secure to said mounts in a secured state and including
      (1) a pair of framework leg sections having first and second ends,
      (2) a framework central section interconnecting the second ends of said framework leg sections,
      (3) a transverse mounting bracket secured to each of the first ends of each said framework leg section, and
      (4) a trunnion pin extending outwardly of each mounting bracket in opposite directions from one another and positioned to engage said mounts when in the secured state; and
   (C) a cover adapted to enclose said framework, including
      (1) first and second panels space-apart from one another in substantially parallel planes and each having a front edge, a rear edge and a pair of side edges,
      (2) a pair of side panels extending alongside a respective said leg section of said framework and each having opposite first and second side edges, a front side edge and a rear side edge, each of said side panels being joined to said first and second panels along the respective side edges thereof, each said side panel having an opening proximate to the front side edge thereof sized and adapted to matably receive said trunnions therethough,
      (3) an end panel extending alongside said central section of said framework having opposite first and second edges and opposite end edges, said end edges being joined to the respective rear side edges of said side panels and said first and second edges being joined, respectively, to the rear edges of said first and second panels to define first and second rear seams and thereby to form an enclosure with an opening and an interior sized and adapted to receive said C-shaped framework therein,
      (4) a closure panel adapted selectively to open the opening of said enclosure to define an open state and to close the opening of said enclosure to define a closed state, and
      (5) a releasable fastener associated with said closure panel and operative to retain said closure panel in the closed state.

9. A combination frame extender and cover according to claim 8 wherein said framework includes at least one leg extending transversely of said central section and having opposite leg ends, said cover including a pair of opposed pocket structures adapted to receive the opposite leg ends of each said leg.

10. A combination frame extender and cover according to claim 9 including a plurality of legs extending transversely of said central section.

11. A combination frame extender and cover according to claim 8 wherein said closure panel has a first edge that is secured to said first panel along the front edge thereof and including one-half of a cooperative fastener on a second edge thereof opposite said first edge, said second panel including another half of said cooperative fastener along the front edge thereof.

12. A combination frame extender and cover according to claim 11 wherein said closure panel is an integral extension of one of said first and second panels.

13. A combination frame extender and cover according to claim 8 wherein each of said side panels includes a flap extending forwardly of said front side edge thereof and including mating fasteners operative to secure each said flap around a respective said transverse bracket.

14. A combination frame extender and cover according to claim 13 wherein one member of each mating fastener is secured to said flap and another member of each mating fastener is secured to the respective bracket.

15. A combination frame extender and cover according to claim 8 including at least one leg extending transversely of said central section and wherein said framework is formed by a plurality of C-shaped members oriented in parallel spaced-apart relation and secured to one another by said leg and said mounting brackets.

16. A cover adapted to mount over a frame extender on a vehicle wherein said frame extender includes a generally C-shaped framework having a pair of leg sections and a central section joining said leg sections at one end thereof, said cover comprising:
(A) first and second panels each having a front edge, a rear edge and a pair of side edges;
(B) a pair of side panels each having opposite first and second side edges, a front side edge and a rear side edge, each of said side panels being joined to said first and second panels along the respective side edges thereof;
(C) an end panel having opposite first and second edges and opposite end edges, said end edges being joined to the respective rear side edges of said side panels and said first and second edges being joined, respectively, to the rear edges of said first and second panels respectively along first and second rear seams thereby to form an enclosure with an opening and an interior sized and adapted to receive said C-shaped framework therein such that said end panel is positioned in confronting relation to said central section and such that side panels are each positioned in confronting relation to a respective said leg section, and including at least one pocket structure located along at least one of said first and second rear seams; and
(D) a closure panel adapted selectively to open the opening of said enclosure to define an open state and to close the opening of said enclosure to define a closed state.

17. A cover adapted to mount over a frame extender on a vehicle wherein said frame extender includes a generally C-shaped framework having a pair of leg sections and a central section joining said leg sections at one end thereof, said cover comprising:
(A) first and second panels each having a front edge, a rear edge and a pair of side edges;
(B) a pair of side panels each having opposite first and second side edges, a front side edge and a rear side edge, each of said side panels being joined to said first and second panels along the respective side edges thereof, each of said side panels including a flap extending forwardly of said front side edge thereof and including cooperative fasteners operative to secure each said flap around a portion of said framework;
(C) an end panel having opposite first and second edges and opposite end edges, said end edges being joined to the respective rear side edges of said side panels and said first and second edges being joined, respectively, to the rear edges of said first and second panels thereby to form an enclosure with an opening and an interior sized and adapted to receive said C-shaped framework therein such that said end panel is positioned in confronting relation to said central section and such that said side panels are each posited in confronting relation to a respective said leg section; and
(D) a closure panel adapted selectively to open the opening of said enclosure to define an open state and to close the opening of said enclosure to define a closed state.

18. A cover according to claim 16 wherein said at least one pocket structure is located along said first rear seam.

19. A cover according to claim 16 wherein said at least one pocket structure is located along said second rear seam.

20. A cover according to claim 16 including at least one pocket structure located along each of said first and second rear seams.

21. A cover according to claim 20 including a plurality of pocket structures located along each of said first and second rear seams.

* * * * *